INVENTORS
Theodore Ongaro
and
Paul A. Ryan,
BY
ATTORNEYS

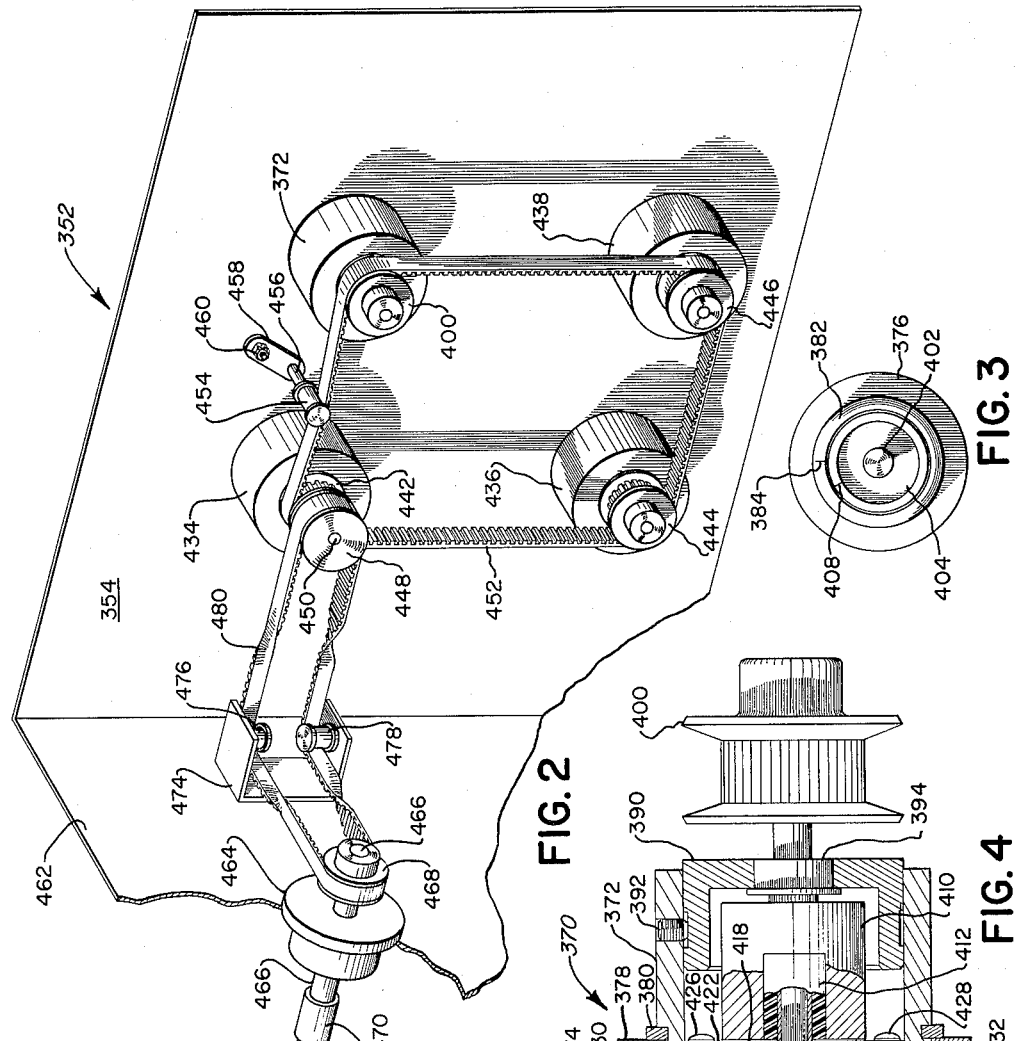

Oct. 12, 1965     T. ONGARO ETAL     3,211,008
BALANCING MACHINE
Filed Jan. 18, 1961                           5 Sheets-Sheet 3
*Fig. 5*
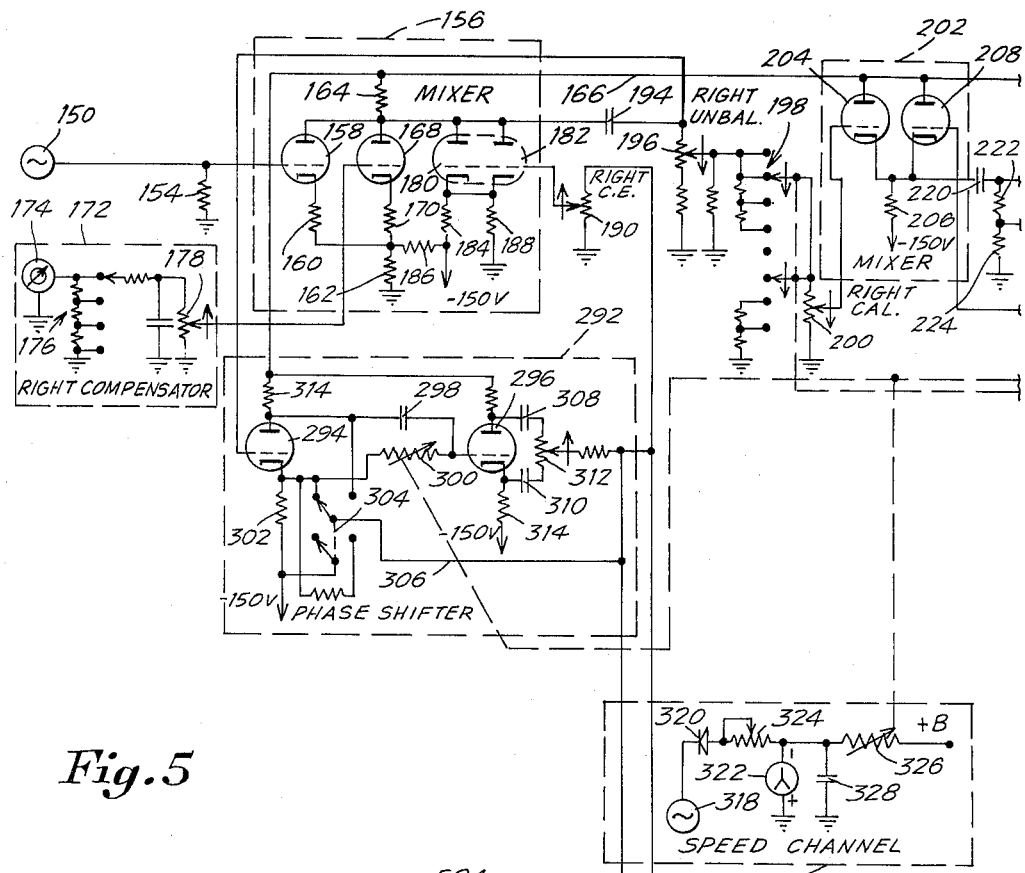
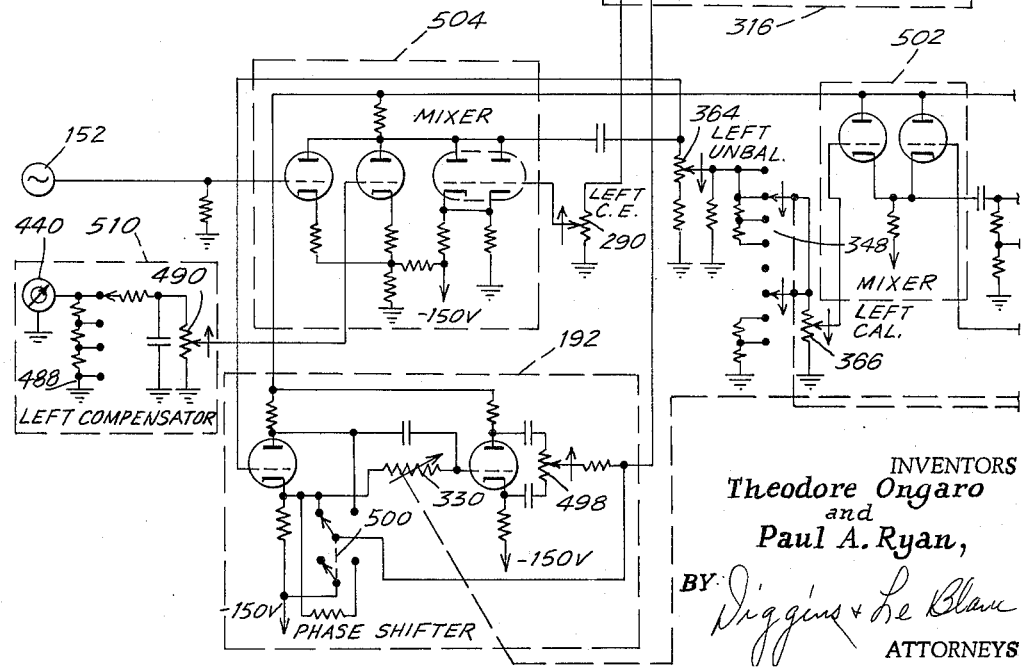
INVENTORS
Theodore Ongaro
and
Paul A. Ryan,
BY Diggins & LeBlanc
ATTORNEYS

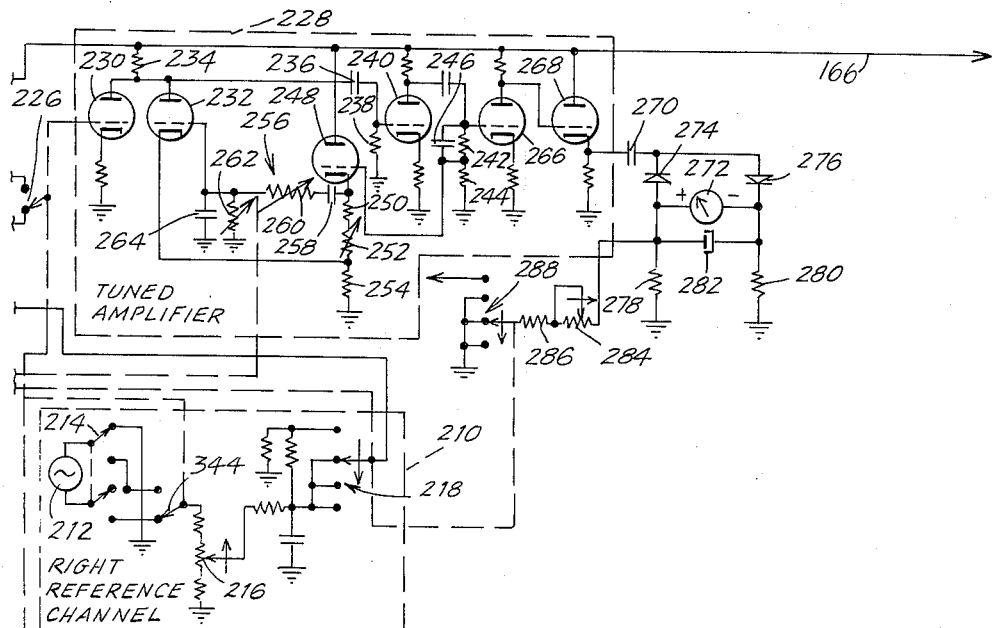
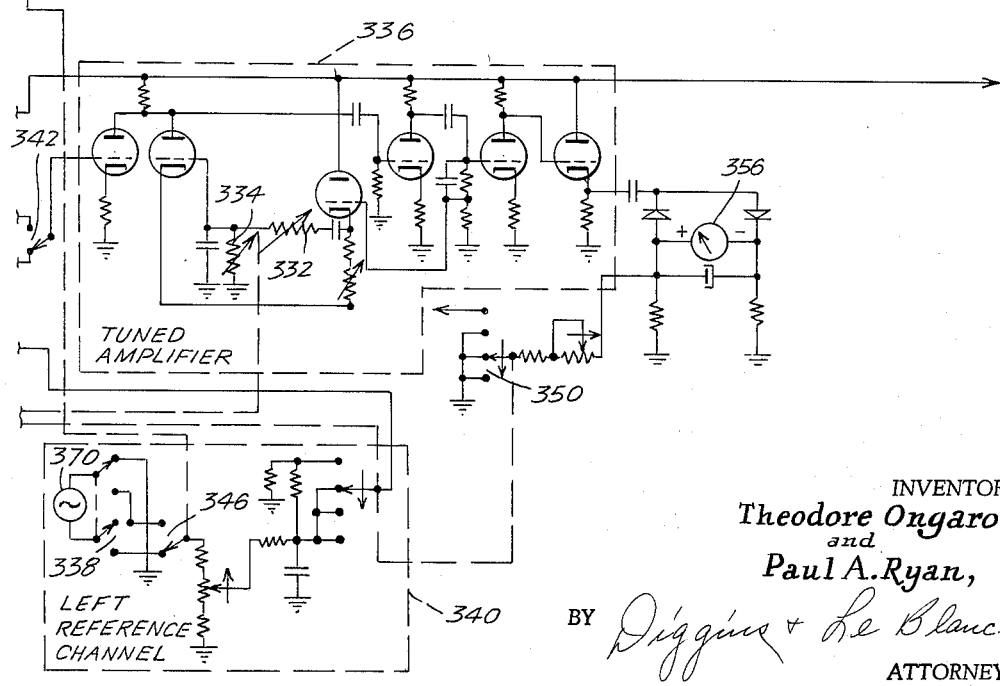
Fig. 6
INVENTORS
Theodore Ongaro
and
Paul A. Ryan,
BY Diggins + Le Blanc
ATTORNEYS INVENTORS
*Theodore Ongaro*
and
*Paul A. Ryan,*
BY *Diggins + Le Blanc*
ATTORNEYS United States Patent Office 3,211,008
Patented Oct. 12, 1965

3,211,008
BALANCING MACHINE
Theodore Ongaro and Paul A. Ryan, Columbus, Ohio, assignors to International Research & Development Corp., Worthington, Ohio, a corporation of Ohio
Filed Jan. 18, 1961, Ser. No. 83,444
7 Claims. (Cl. 73—462)

This invention relates to a machine for balancing rotating objects and more particularly relates to a two-plane balancing machine wherein the balance operation may be carried out without the necessity for recording transitory quantitative indications of any meters or stroboscopic lights.

In the analysis of vibration and the balancing of rotating objects several electrical or electronic methods have been utilized. According to the most rudimentary system utilizing a minimum amount of equipment, the unbalance in two spaced planes is eliminated one plane at a time by means of an amplitude indicating device in conjunction with a stroboscopic light or other means for indicating the rotational or angular position of unbalance. Repeated observations and trial corrections are necessary in a cut and try approach. With more sophisticated equipment two plane balancing is accomplished through the use of electrical circuitry which eliminates so-called cross effect between the two planes so that, theoretically at least, only one analysis and balancing operation is necessary. This latter type of equipment may utilize stroboscopic lights or may utilize reference generators driven in synchronism with the rotating body in order to provide an indication of the angular position of the unbalance. In all such systems of which the inventors are aware it is necessary to record transitory meter readings or transitory stroboscopic light readings in order to arrive at the final data necessary to the balancing operation.

According to the present invention, it has been found that it is possible to provide equipment for two plane balancing wherein no transitory quantitative meter or stroboscopic light readings need be recorded or remembered. On the contrary, the apparatus includes no stroboscopic light nor meters which are numerically quantitatively marked but rather provides all of the necessary balance correction information in the form of dial readings automatically available at the end of the analysis procedure. As a result there is no possibility of erroneous transcription of meter readings nor is there any necessity for the balance operator recording any data whatsoever. This desirable end is achieved without the use of any equipment in excess of that which was previously necessary in two plane balancing systems.

It is a further feature of this invention that the addition of a trial weight to the piece to be balanced, and the addition or subtraction of weight in order to effect balance after the analysis is complete, are all made at the same predetermined position. Because of this feature it is possible to utilize the uppermost or lowermost point on a rotor to be balanced as the position of weight addition or subtraction thereby eliminating the necessity of providing a stationary marker adjacent the rotor as has been required with prior systems. In particular, the apparatus of this invention eliminates the necessity for the use of an angular scale in association with the rotor or other piece to be balanced.

With the apparatus of the invention it is possible to balance a rotor in position in the machine of which it forms a part so long as it is possible to obtain access to the rotor approximately at the position of the two planes in which unbalance correction is to be achieved. As a result it is practical to carry out balancing operations at the normal speed of operation of the rotor and means is provided to automatically adapt the balancing unit to this speed. That is to say, a tachometer generator is coupled to the rotor to be balanced and the output of this generator is associated with suitable circuitry and a meter in the balancing apparatus so that an indicator in the balancing apparatus may be set to the desired speed and the speed control of the machine of which the rotor forms a part thereupon adjusted until a meter in the balancing apparatus provides a mid-scale, null or maximum reading. The setting of the speed indicator in the balancing apparatus also controls suitable filter circuits so that further adjustment of the balancing apparatus for the particular frequency of unbalance is unnecessary.

According to the invention two transducers or pickups are associated with the selected planes for balance correction in a rotor to be balanced and the outputs of these pickups are fed to a pair of mixers. A pair of compensator generators driven by the rotor feed signals into the mixers and the amplitude and phase of these signals are adjusted to simulate a perfectly balanced rotor. Known trial weights are then added sequentially to the two planes and signals are fed across from one pickup into the other mixer through suitable phase shifting and amplitude control networks in order to effect electronic plane separation. The outputs of the mixers are in turn fed through unbalance networks which contain a pair of attenuators feeding amplitude indicating meters. One attenuator in each pair has a calibrated scale associated therewith and this scale is set to the value of the trial weight actuating its pickup. The second attenuator in that particular channel, referred to as a calibrating attenuator, is then adjusted so that the meter reads full scale. After this adjustment has been made, it is possible to remove the trial weight and thereupon readjust the unbalance attenuator whereupon its scale reading indicates the amount of unbalance in that particular plane.

Between the unbalance networks and the meters there are disposed a further pair of mixers which receive the signals from the unbalance networks and which also are connectable to receive signals from reference generators driven by the rotor under test. These reference generators are of the rotatable stator type and the stator is provided with an indicia bearing a single reference marker. The rotors of the generators also carry an indicia disposed adjacent the stator indicia and these latter indicia also bear a single reference marker. The rotor indicia are releasably attached to the rotors so that upon release they may be rotated relative to the position of the generator rotors.

After the unbalance network has been calibrated the reference generators are switched into the circuit so as to supply signals to the mixers and the phase of these signals is adjusted to null the meters. If a trial weight added after a perfect rotor has been simulated was positioned in a pre-determined spot, the position of the stator of the reference generator associated with the plane of weight addition provides an indication of the position of the unbalance weight. At this time the indicia associated with the rotor of that reference generator is released and is rotated so that its reference marker is in alignment with the reference marker on the indicia associated with the stator of the same reference generator. This is done for both planes. The trial weights are thereafter removed, the unbalance attenuators adjusted so that the appropriate meters read full scale, the stators of the reference generators are rotated to null the meters, and the reference markers on the indicia associated with the rotors of the reference generators are sequentially rotated into alignment with the reference markers on the stators by manual rotation of the rotor. Because of the previously established relationship, the position of the unbalance weight will now be directly in the physical position at which the reference weight was added so that both the amount and position of unbalance have been determined without the necessity for recording quantitative transitory indications of any meters.

It is accordingly a primary object of the present invention to provide an improved two plane balancing apparatus wherein a rotaating object may be balanced without the necessity of recording quantitative transitory measurements of any meters or stroboscopic lights.

It is another object of the invention to provide an improved two plane balancing apparatus utilizing a pair of transducers and meter indicating means with an unbalance network between each meter and the meter indicating means, each unbalance network including a pair of attenuataing devices, at least one of which includes an indicaating scale whereon the setting of the attenuator indicates the amount of unbalance at the termination of the balance analysis procedure.

It is still another embodiment of the invention to provide an improved two plane balancing machine utilizing a pair of reference generators for indicating the position of unbalance wherein the generators have rotatable stators associated with reference marker bearing indicia and wherein these same generators have rotors which are also associated with reference marker bearing indicia which are releasably connected to the rotors to permit the apparatus to position the rotor being balanced in such a way that weight correction is effected at the same position as the addition of trial weights during the balancing procedure.

It is another object of the invention to provide an improved two plane balancing apparatus including tunable filter devices and including a tachometer and speed indicating meter associated with a speed setting control which automatically adjusts the filters to the speed of operation of the rotor or other work piece under test.

It is a still further object of the invention to provide an improved two plane balancing apparatus of the foregoing type which is operable in a manner to minimize the chance of operator error.

These and further objects and advantages of the invention will become more apparent upon reference to the following specification and claims and the appended drawings wherein:

FIGURE 2 is a partial perspective view showing the back of the front panel of an apparatus constructed according to the invention and particularly demonstrating the drive connections for the various generators;

FIGURE 3 is a front elevation of the indicia knobs attached to the reference generators;

FIGURE 4 is a vertical section of a suitable generator;

Figure 7:
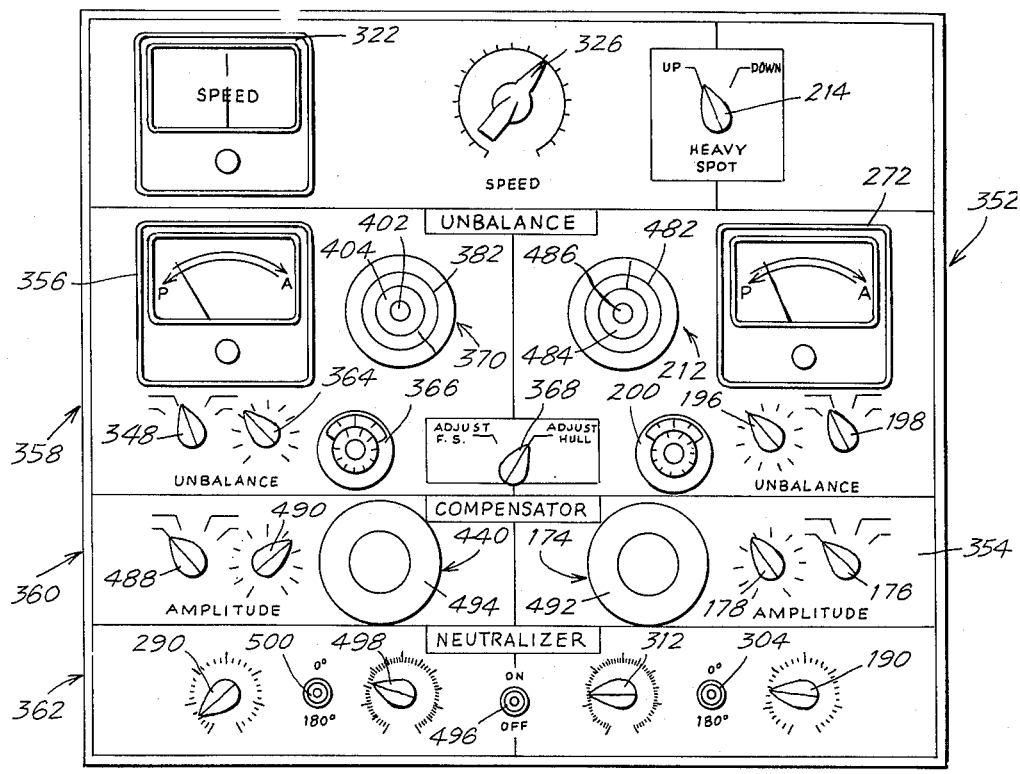

FIGURES 5 and 6 constitute a circuit diagram of an apparatus constructed according to the invention; and FIGURE 7 is a front elevation of a balancing machine constructed according to the invention.

Figure 1:
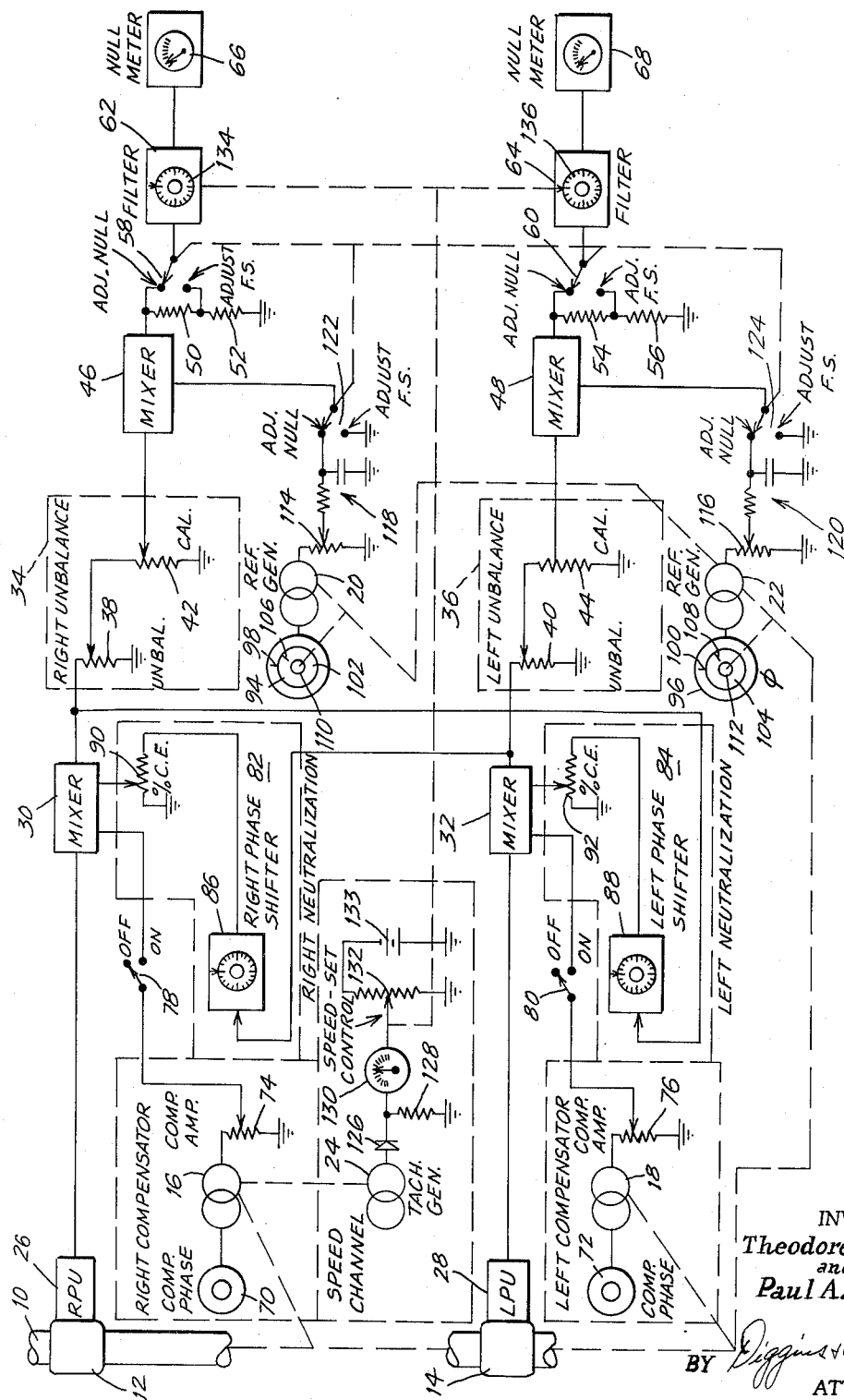
FIGURE 1 is a block diagram of a balancing apparatus constructed according to the present invention.

Referring to FIGURE 1, a rotor or work piece 10 rotating in a pair of bearings 12 and 14 is mechanically connected to a pair of compensator generators 16 and 18, to a pair of reference generators 20 and 22, and to a tachometer generator 24. A right transducer or pickup 26 is associated with the upper bearing 12 and a left transducer or pickup 28 is associated with the lower or left bearing 14. The transducers 26 and 28 deliver signals to a pair of mixers 30 and 32 which in turn feed right and left unbalance units or networks 34 and 36. The unbalance networks 34 and 36 consist of unbalance attenuators 38 and 40 and calibration attenuators 42 and 44, which are connected in series.

The unbalance networks feed inputs to further mixers 46 and 48 which feed load resistors 50–52 54–56 respectively. Adjust null-adjust-Full Scale switches 58 and 60 are respectively connected to the load resistors 50–52 and 54–56 to select either the voltage across both resistors or only the voltage across the lower resistor in each network. The movable arms of these switches are connected to tunable or adjustable band pass filters 62 and 64 which are in turn connected to null meters 66 and 68.

The compensator phase generators 16 and 18 are of the rotatable stator type wherein rotation of the stator produces a change in phase of the output of the generator. Stator control knobs 70 and 72 are provided to permit control of such phase variation. The outputs of compensator generators 16 and 18 are fed to variable load resistors 74 and 76 and these are connected through Off-On switches 78 and 80 to the mixers 30 and 32.

Electronic plane separation is provided by right and left neutralization networks 82 and 84 consisting of phase shifters 86 and 88 and cross effect attenuators 90 and 92. The right phase shifter 86 receives an input from the output of mixer 32 in the left channel and feeds an input into mixer 30 in the right channel through the attenuator 90. Conversely, the left phase shifter 88 receives an input from the output of the mixer 30 in the right channel and feeds an input into the mixer 32 in the left channel through the attenuator 92.

The reference generators 20 and 22 are also of the rotatable stator type having the stators respectively connected to indicator knobs 94 and 96 bearing reference marks 98 and 100. The rotors of these generators are connected to rotatably mounted discs 102 and 104 carried within the stator knobs 94 and 96 and bearing reference marks 106 and 108. The discs 102 and 104 are releasably attached to the generator rotors by means of screws 110 and 112. The outputs of the reference generators 20 and 22 are fed through attenuators 114 and 116 and integrating networks 118 and 120 to Adjust-Null-Adjust-Full Scale switches 122 and 124, which are in turn connected to the mixers 46 and 48. The movable arms of all Adjust-Null-Adjust-Full Scale switches 58, 60, 122 and 124 are mechanically ganged so as to be controllable by one control knob.

The tachometer generator 24 produces an alternating current output which is rectified by a diode 126 to develop a direct current voltage across a resistor 128. This voltage is compared by a center scale zero meter 130 to the voltage selected across a variable resistor 132 which is connected to a voltage source 133. The movable tap of variable resistor 132 is mechanically ganged with the controls 134 and 136 of the tunable filters 62 and 64 for a purpose presently to become apparent.

In operation, the right and left pickups 26 and 28 are mounted in engagement with the bearings 12 and 14 of the rotor or workpiece 10 which is to be balanced and the rotor is drivingly connected to the compensator generators 16 and 18, the reference generators 20 and 22 and the tachometer generator 24. The variable resistor 132 associated with the tachometer generator is calibrated in terms of speed and is now set to the speed at which it is desired to balance the rotor. This creates a voltage across the resistor 132 proportional to the speed and the speed of the rotor is adjusted until the meter 130 indicates that the voltage across resistor 132 is equal to that across the load resistor 128 which is produced by the tachometer generator. This same setting of the speed adjusting resistor 132 also adjusts the controls 134 and 136 of the filters 62 and 64 which precede the null meters 66 and 68.

Adjust-Null-Adjust-Full Scale switches 58, 60, 122 and 124 are set to the Full Scale positions which are the lower positions in FIGURE 1. The Off-On compensator switches 78 and 80 are set to Off and the cross effect attenuators 90 and 92 in the right and left neutralization units are set to zero. After the foregoing adjustments have been made the right pickup 26 feeds a signal through the right mixer 30, right unbalance network 34, mixer 46, switch 58 and filter 62 to the null meter 66. Neither the comparator generator 16 nor the reference generator 20 is feeding a signal into the right channel at this time. Similarly, the left pickup 28 feeds a signal through mixer 32, left unbalance network 36, mixer 48, switch 60 and filter 64 to null meter 68. Compensator generator 18 and reference generator 22 are effectively out of the circuit.

The right and left unbalance attenuators 38 and 40 are now adjusted to give full scale readings on the null meters 66 and 68 respectively. The right and left Off-On compensator switches 78 and 80 are switched to the On position. The right compensator phase knob 70 and the attenuator 74 are now adjusted to null the right null meter 66 and the left compensator phase knob 72 and compensator attenuator 76 are adjusted to null the left null meter 68. In this condition the compensators are electronically simulating a perfectly balanced rotor as seen by the null meters 66 and 68.

The rotor 10 is now stopped and a trial weight of known value is applied approximately at the plane of the right bearing 12. The rotor is again brought up to speed as indicated by a center scale reading of the speed meter 130. Any reading of the left null meter 68 due to this weight placed in the right plane is a cross-effect reading and may be neutralized by adjusting the left phase shifter 88 and left cross-effect attenuator 92 to null the left null meter 68.

Turning to the right unbalance unit 34, the right unbalance attenuator 38 is now set to the value of the trial weight which was added in the right plane. The calibration attenuator 42 is then adjusted for full scale deflection of the right null meter 66.

The Adjust-Null-Adjust-Full Scale switches 58, 60, 122 and 124 are now switched to the Null Scale position which is the upper position in FIGURE 1 and the stator control knob 94 of the reference generator 20 is adjusted for the best null of the right null meter 66. When this occurs the signal from the right reference generator 20 is 180° out of phase with the signal from the calibration attenuator 42. The rotor is now stopped and rotated until the trial weight is at the top (or the bottom may be used if more convenient). The screw 110 holding the disc 102 to the rotor of reference generator 20 is loosened and this disc is rotated until its reference mark 106 is in alignment with the reference mark 98 on the stator knob 94, and the screw tightened. Once this relationship has been established it is known that when the location of the unbalance weight is up or at the top of the rotor and the right reference generator 20 is producing a signal 180° out of phase with that across the calibration attenuator 42, the two reference marks 98 and 106 are in alignment. As a result, when an unbalance measurement is later taken and the reference generator 20 is used to null the signal across the calibration attenuator 42, it will be known that when the two reference markers 98 and 106 are in alignment the unbalance weight is at the top of the rotor.

The trial weight is now moved from the right to the left side of the rotor 10 and the Adjust-Null-Adjust-Full Scale switches 68, 60, 122 and 124 are switched to the Full Scale position. The rotor is started and brought up to speed as indicated by the speed meter 130. The right null meter 66 now reads the cross effect from the left plane and this is neutralized by means of the right phase shifter 86 and the right cross effect attenuator 90.

The left unbalance attenuator 40 is now set to the value of the trial weight and the left calibration attenuator 44 is adjusted until the left null meter 68 reads Full Scale. The Adjust-Null-Adjust-Full Scale switches 58, 60, 122 and 124 are switched to the null position placing the reference generator 22 in the circuit and its stator knob 96 is rotated to obtain the best null possible on the left null meter 68. The rotor 10 is now stopped and rotated by hand until the trial weight is at the top, the screw 112 securing the disc 104 to the rotor of the left reference generator 22 is loosened, and the disc is rotated until its reference mark 108 is in alignment with the reference mark 100 on the stator knob 96. The screw 112 is then tightened.

The trial weight is now removed completely from the rotor and the rotor brought up to speed as indicated by the speed meter 130. The Adjust-Null-Adjust-Full Scale switches 58, 60, 122 and 124 are set to the Full Scale position and the right and left compensator Off-On switches 78 and 80 are turned Off thereby eliminating the simulation of a perfectly balanced rotor.

The right and left unbalance attenuators 38 and 40 are now adjusted until both null meters 66 and 68 read Full Scale whereupon the scales on the attenuators directly indicate the amount of unbalance in the right and left planes respectively.

The Adjust-Null-Adjust-Full Scale switches 58, 60 122 and 124 are now set to the Null position and the stator knobs 94 and 96 of the reference generators 20 and 22 are adjusted for the best null obtainable. The rotor 10 is stopped and rotated by hand until the right reference markers 98 and 106 associated with the right reference generator 20 are in alignment and at this time the uppermost position upon the rotor in the right plane is the position at which the amount of weight indicated by the scale of the unbalance attenuator 38 must be removed in order to balance the right end of the rotor. The rotor is then rotated until the reference markers 100 and 108 associated with the left reference generator 22 are in alignment and at this time the uppermost position of the rotor at the left plane is the position at which the amount of weight indicated by the left unbalance attenuator 40 must be removed in order to balance the left end of the rotor.

It will now be apparent that in the operation of the apparatus and method of this invention it is never necessary to record the readings of meters nor of the positions indicated by stroboscopic lights. The amounts of unbalance are indicated by the settings of the unbalance attenuators 38 and 40 at the termination of the tests and the positions of unbalance are directly upward when the respective reference marks 98 and 106 and 100 and 108 are in alignment. The possibility of error in the recording of transitory meter readings is almost competely eliminated as is the difficulty which is frequently encountered in accurately reading the position of a reference mark under the illumination of a stroboscopic light.

Referring now to FIGURES 5, 6 and 7 there is shown a detailed circuit diagram and constructional view of a specific embodiment of the invention. In that embodiment a pair of transducers 150 and 152 feed signals into right and left channels respectively. Both channels are identical and except where interconnection is accomplished, only the right channel will be described. The right pickup 150 develops an output voltage across a load resistor 154 and this is fed to a mixer 156. The mixer 156 consists of a first triode 158 having its grid connected to the load resistor 154 and having its cathode returned to ground through a resistor 160 and a common cathode resistor 162. The plate of triode 158 is connected to a load resistor 164 which terminates in a positive supply lead 166. A second triode 168 shares this plate load resistor and also has its cathode connected through a resistor 170 to the common cathode resistor 162. The input to the grid of this triode is provided by the right compensator 172 which consists of the right compensator generator 174, right compensator multiplier 176 and right compensator amplitude adjuster resistor 178.

A dual triode 180 and 182 completes the mixer 156 and has the plate of triode 180 connected to the common plate load resistor 164. The cathode of this triode is connected through a cathode resistor 184 and resistor 186 to the common cathode resistor 162. The other triode 182 has its plate also connected to the common plate load resistor 164 and its cathode connected to the cathode of the triode 180. The cathode of triode 182 is also returned to ground through a cathode resistor 188. Input to the triode 182 is provided by the right cross effect variable resistor 190 which receives a signal from the phase shifter 192 in the left channel in a manner presently to be described.

The output of the mixer 156 is fed through a coupling capacitor 194 to the right unbalance variable resistor 196 and thence to the right unbalance multiplier 198. The signal from the multiplier 198 is connected to the right calibration variable resistor 200 and this feeds an input to the mixer 202.

Mixer 202 consists of a first triode 204 having its plate connected directly to the positive supply line 166 and having its cathode connected to a negative 150 volt supply through a resistor 206. This triode receives an input from the calibration variable resistor 200. The mixer 202 contains a second triode 208 which also has its plate directly connected to the positive supply line 166 and its cathode connected through resistor 206 to a negative 150 volt supply. The input to the grid of this triode is supplied by the right reference channel 210.

Right reference channel 210 consists of the right reference generator 212 which is connected through a double pole double throw switch 214 to the right reference generator gain control 216. The double pole double throw switch 214 permits reversal of the phase of the right reference generator 212 to allow the operator to have either the heavy or the light spot of the rotor under test placed in the uppermost position after termination of the test procedure. The signal from the right reference generator gain control 216 is fed through a right reference generator multiplier 218 to the grid of the triode 208.

The output of mixer 202 is fed through a coupling capacitor 220 to a pair of series connected load resistors 222 and 224 which are connected to the Adjust-Null-Adjust-Full Scale switch 226. The movable arm of this switch delivers an input to the tuned amplifier 228. This tuned amplifier consists of a first amplifier triode 230 whose output is shunted by a reactance triode 232. The plate of amplifier triode 230 is connected to the positive supply line 166 through a plate load resistor 234 and an output is fed from this plate through a coupling capacitor 236 to a grid load resistor 238. The voltage across the resistor 238 is amplified in a further triode amplifier 240 which provides a voltage across a network consisting of resistors 242 and 244 and capacitor 246. The voltage across the resistor 244 is fed to the grid of a feed back triode 248 having its plate connected to the positive supply line 166 and its cathode connected to ground through a series of resistors 250, 252 and 254. The triode 248 is connected as a cathode follower and feeds a signal to a filter network generally indicated at 256. The filter network 256 consists of capacitor 258, variable resistor 260, variable resistor 262 and capacitor 264. An output from the filter is taken from variable resistor 262 and fed to the grid of the reactance triode 232.

It will be apparent to those skilled in the art that the reactance triode 232, filter 256 and feedback triode 248 cause the tuned amplifier 228 to be degenerative except at the frequency to which the filter 256 is tuned so that the amplifier constitutes a tunable band pass amplifier. The output across load resistors 242 and 244 is fed through an amplifier triode 266 to the grid of a direct coupled triode 268 which is connected as a cathode follower to provide an output through a coupling capacitor 270.

The right null meter 272 has its terminals connected to the coupling capacitor 270 through a pair of reversely connected diodes 274 and 276 which are also connected to load resistors 278 and 280. A large capacitor 282 is connected across the right null meter 272 and the upper terminal of the load resistor 278 is connected to a variable resistor 284, resistor 286 and thence to the movable arm on a multiple position switch 288 which is mechanically ganged with the multiplier switch 198 of the right unbalance control.

The right cross effect variable resistor 190 at the output of the mixer 156 has its upper end connected to the output of the phase shifter 192 while the left cross effect variable resistor 290 has its upper end connected to the output of the phase shifter 292.

Considering the phase shifter 292, it will be seen that this unit consists of a triode 294 which receives an input from the top of the right unbalance variable resistor 196. The plate of this triode is connected to the grid of a following triode 296 through a coupling capacitor 298 while the cathode is connected to the grid of the triode 296 by means of a variable resistor 300. The cathode of triode 294 is also connected to a negative supply voltage through a cathode resistor 302 and a double pole double throw switch 304 is connected between the plate and cathode of triode 294 so as to provide on the output lead 306 a signal voltage at zero or 180° phase as selected by the switch 304. The plate and cathode of triode 296 are connected through capacitors 308 and 310 to the phase shifter variable control resistor 312. The cathode of this triode 296 is also connected through a resistor 314 to a source of negative supply voltage. As previously stated, the output of the phase shifter 292 taken from the variable tap of the control resistor 312 is fed into the left cross effect variable resistors 290 in the left channel.

The triodes 294 and 296, variable resistor 300, reversing switch 304 and variable resistor 312 comprise a phase shift network preferably capable of providing 360° of phase shift. The coupling capacitor 298 between the plate of triode 294 and the grid of triode 296 and the variable resistor 300 between the cathode of 294 and the grid of triode 296 provide a constant 90° phase shift regardless of the input frequency. Triode 296 provides voltages of +180° and −180° at the ends of the variable control resistor 312 and a voltage selected by the variable tap on this resistor is added to the voltage across either cathode resistor 302 or plate load resistor 314 in the circuit of the triode 294. In this manner a full 360° phase shift is available at substantially constant voltage throughout the phase shift range.

The embodiment of the invention illustrated in FIGURES 5, 6 and 7 is provided with a speed channel 316 containing a tachometer generator 318 which is mechanically coupled to the rotor or work piece under test and which delivers an output to a diode 320. A center scale meter 322 has one terminal thereof grounded and the other terminal connected to the diode 320 through an adjusting resistor 324. The meter 322 also receives a voltage input from the positive supply source through a variable resistor 326 which produces a voltage across the capacitor 328. The voltages produced by the tachometer generator, on the one hand, and by the positive supply potential feeding through the variable resistor 326, on the other hand, are in opposition so that the meter 322 gives a center scale reading when the voltages are equal. It will be apparent that by setting the control of the variable resistor 326 it is possible to determine the value of voltage fed to the meter 322 and therefore the speed of the rotor which will be necessary to generate an equal and opposite voltage in the tachometer generator.

The variable resistor 326 therefore constitutes a speed adjusting resistor and is mechanically ganged with the variable resistor 300 in the phase shifter 292, the corresponding variable resistor 330 in the phase shifter 192, the variable filter resistors 260 and 262 in the right tuned amplifier 228 and the corresponding variable resistors 332 and 334 in the left tuned amplifier 336. These controls are so arranged that the setting of the speed adjusting resistor 326 in the speed channel 316 automatically adjusts the filter resistors and the resistors 300 and 330 in phase shifters 282 and 192 for the frequency of signal produced by the transducers.

In addition to the ganging of the foregoing controls; the heavy spot up or down control switches 214 and 338 in the right and left reference channels 210 and 340 are ganged, the Adjust-Null-Adjust-Full Scale switches 226, 342, 344 and 346 are ganged, and multiplier switches 198 and 288 and multiplier switches 348 and 350 are also connected together.

The unit of FIGURES 5 and 6 is mounted in a cabinet or housing 352 having a front panel 354 on which the various controls are mounted. Referring to FIGURE 7 there are seen the speed meter 322, left null meter 272 and right null meter 356. The speed control 326 is mounted adjacent the speed meter 322 and the switch 214 for controlling the position of the heavy spot is mounted immediately to the right of this. It will be noted that the controls are grouped into an unbalance strip 358, a compensator strip 360 and a neutralizer strip 362 with each strip containing both left and right controls.

The unbalance strip 358 contains the unbalance multiplier switches 198 and 348 and the unbalance control resistors 196 and 364. The right and left calibrating control resistors 200 and 366 are mounted on either side of the Adjust-Null-Adjust-Full Scale switch control knob 368. The reference generators 212 and 370 are mounted on the panel 354 between the null meters 272 and 356 as now will be described.

While numerous movable stator alternating current generators are available for indicating phase position, it is a feature of the present invention to use a unique mounting arrangement which permits the apparatus of the invention to be used to accomplish balancing without necessitating quantitative phase position reading. Referring to FIGURE 4, the left phase generator 370 is shown as comprising a housing 372 from which a shoulder 374 and flange 376 extend in annular fashon. The housing 372 is rotatably secured to the front panel 354 by means of a mounting ring 378 held in position by a snap ring 380. The portion of the housing 372 to the left of the panel 354 in FIGURE 4 constitutes a phase control knob 382 having a reference marker 384 inscribed radially on the edge thereof.

An inner wall 386 extends across the inside of the phase control knob 382 and receives a rotor bearing 388. A closure cap 390 is secured in the other end of the housing 372 by means of a set screw 392 and this cap mounts the other rotor bearing 394. A permanent magnet rotor indicated generally at 396 is mounted within the rotor bearings 388 and 394 on a shaft 398, and a portion of this shaft extends through the bearing 394 to receive a toothed pulley 400. The other end of the rotor shaft 398 receives a shouldered screw 402 which secures a disc 404 to the rotor shaft within the recess 406 at the end of the phase shift knob 382. The disc 404 carries a radial reference mark 408 as is seen in FIGURE 3.

The rotor 396 is formed of two halves 408 and 410 which are mounted on an insulating sleeve 412 on the rotor shaft 398. A magnetic disc 414 is carried intermediate the ends of the rotor shaft 398 and rotates between stator coils 416 and 418 carried by annular insulating discs 420 and 422. The annular insulating members 420 and 422 are in turn secured to a further annular member 424 by means of screws 426 and 428. Annular member 424 is fastened within the housing 372 by means of set screws 430 and 432. The actual configuration of the rotor and of the stator coils may be of any conventional arrangement capable of producing an alternating current voltage where the phase of the voltage is dependent upon the rotational position of the stator, 360° of phase shift being produced by 360° of stator rotation.

Referring to FIGURE 2, the housing 372 of the left phase generator is shown extending through the rear of the front panel 354 adjacent the housing 434 for the right phase generator. The housings 436 and 438 for the right and left compensator generators 174 and 440 are mounted directly therebeneath. The shafts of all rotors are provided with toothed pulleys 400, 442, 444 and 446 and an additional pulley 448 is mounted outboard of the pulley 442 on the shaft 450 associated with housing 434. An endless ribbed belt 452 drivingly connects all rotors together and is held in a suitable state of tension by an idler pulley 454 carried by a shaft 456 on an arm 458 fastened to the front panel 354 by a screw and nut 460.

The right wall 462 of the housing or cabinet 352 receives a bearing assembly 464 which carries a shaft 466 having a toothed pulley mounted at the inner end thereof. The shaft 466 is connected by any suitable coupling means, shown illustratively in FIGURE 2 as a direct coupling 470, to the rotor 472 which is under test. A U-shaped bracket 474 is secured to the cabinet wall 462 and carries a pair of pulleys 476 and 478. An endless ribbed belt 480 passes around these pulleys and drivingly connects the pulley 468 to the pulley 448 on the shaft 450 to establish a drive connection between the rotor 472 and all of the generators. The tachometer generator 318 in the speed channel 316 is mounted within the cabinet 352 and is also driven by the shaft 466 by means of a further pulley arrangement, not shown. Referring to FIGURE 7, the phase shift knob 382, disc 404 and screw 402 associated with the left phase generator are seen adjacent the left null meter 356 while the phase shift knob 482, disc 484 and screw 486 associated with the right reference generator are seen adjacent the right null meter 272.

Considering now the compensator strip 360, the right and left compensator multipliers 176 and 488 are mounted adjacent the right and left compensator control resistors 178 and 490. Stator control knobs 492 and 494 attached to stator housings 438 and 436 respectively of the compensator generators 174 and 440 are mounted adjacent one another.

The neutralizer strip 362 contains the On-Off switch 496 for the entire apparatus, the left and right cross effect control resistors 290 and 190, the left and right phase shifter controls 498 and 312 and the left and right phase reversal switches 500 and 304.

The operation of this unit is as follows: A rotor 472 which is to be tested is coupled to the shaft 466 extending from the cabinet 352 of the apparatus and the On-Off switch 496 is turned on. It is normally desired to balance any given rotor at a particular speed, conventionally the operating speed of the rotor, and this speed is now set into the speed control knob 326. The rotor 472 is now rotated and its speed increased until the speed meter 322 gives a center scale reading, at which time the rotor is operating at the desired speed, tuned amplifiers 228 and 336 are adjusted to the right frequency, and phase shifters 292 and 192 are appropriately adjusted. The Adjust-Null-Adjust-Full Scale switch 368 is now switched to the Full Scale position, the right and left compensator multiplier knobs 176 and 488 are turned to Off, and the right and left neutralizer cross effect knobs 190 and 290 are set to zero. Referring to FIGURES 5 and 6, setting the Adjust-Null-Adjust-Full Scale switch control knob 368 to the Full Scale position connects the full output of the mixers 202 and 502 to the inputs of the tuned amplifiers 228 and 336 respectively through the switches 226 and 342. This also disconnects the outputs of the reference generators 212 and 370 from the mixers 202 and 502 by grounding the generator outputs through switches 344 and 346, in the right and left reference channels respectively. Setting the compensator multiplier knobs 176 and 488 to the Off position disconnects the right and left compensator generators 174 and 440 from the mixers 156 and 504. The adjustment of the cross effect knobs 190 and 290 to zero prevents feeding any cross signals into the mixers 156 and 504. At this time the right and left null meters 272 and 356 are being fed signals from transducers 150 and 152 which result from the unbalance of the rotor 472.

The right unbalance knobs 196 and 198 are now adjusted to cause the right null meter 272 to read full scale. This adjustment changes the gain through the right channel. In a similar fashion the left unbalance knobs 348 and 364 are adjusted for full scale deflection of the left null meter 356.

The right compensator multiplier knob 176 is now turned away from the Off position and this knob is adjusted in conjunction with knobs 178 and 492 in the right compensator in order to null the reading of the right null meter 272. Since it was known that a vibration was previously causing the right null meter 272 to read full scale and since the reading of this meter has now been nulled, the right compensator has been used to electronically buck or balance out the vibration signal and thereby simulate balance at the position of the right pickup 150. The left compensator multiplier knob 488 is now switched away from the Off position and the knobs 488, 490 and 494 in the left compensator are adjusted to null the left null meter 356 to bring about the same condition in the left plane. Rotor balance has now been electronically simulated.

The rotor is stopped and a weight of known value is applied to the location where balancing will take place adjacent the position of the right pickup 150. The heavy spot control knob 214 is now switched to the up or down position to determine whether the heavy spot in the rotor will be up or down after the balance steps have been completed.

The rotor is again started and brought up to a speed to cause the speed channel meter 322 to read center scale. Since the trial weight has been applied to the right plane, any reading of the left null meter 356 represents cross effect and this is now neutralized by adjusting the left neutralizer knobs 290 and 498 and the left reversal switch 500. Cross effect of the right plane on the left plane has now been neutralized or eliminated. The right unbalance knobs 196 and 198 are now set to the value of the trial weight which was added to the right plane. As an example, if a 4 ounce weight was added, the multiplier knob 198 is set to one and the digital knob 196 is set to 4. The right calibration knob 200 is now adjusted until the right null meter 272 reads full scale and the calibration control 200 is locked in this position. As long as the calibration knob 200 remains in this position the right unbalance knobs will directly indicate the unbalance weight when the right null meter 272 reads full scale.

The Adjust-Null-Adjust-Full Scale switch 368 is now set to the null position thereby switching the right and left reference channels 210 and 340 into the circuit to feed signals to the mixers 202 and 502 through switches 214 and 338 respectively. The right reference generator phase control knob 492 which controls the phase of generator 212 is now rotated to obtain the best possible null of right null meter 272.

The rotor 472 is now stopped and is rotated by hand until the trial weight is at the top or bottom, whichever position was selected by the switch 214. The fastening screw 486 associated with the right reference generator 212 is now loosened and the disc 484 which is attached to the rotor of that generator is rotated until the reference marker thereon lines up with the reference marker on the phase control knob 482 of the same generator. The screw 486 is thereupon tightened.

The trial weight is now removed from the right plane and is mounted in the location at which balancing will take place on the left side adjacent the position of the left pickup 152. The Adjust-Null-Adjust-Full Scale switch 368 is now set to the Full Scale position thereby switching the right and left reference channels 210 and 340 out of the circuit.

The rotor 472 is started and its speed increased until the speed meter 322 reads central scale. Since the compensators 172 and 510 have been previously adjusted to simulate a balanced rotor and since the trial weight is now in the left plane, any reading of the right null meter 272 represents cross effect from the left to the right plane. This is now eliminated by adjustment of the right neutralizer knobs 190 and 312 and the right neutralizer reversal switch 304 for a complete null on the right unbalance meter 272. After this has been accomplished plane separation has been set into the instrument.

The left unbalance knobs 348 and 364 are now set to the units of weight of the trial weight as previously described in connection with the right channel and the left calibration knob 366 is adjusted until the left null meter gives a full scale reading. This calibration control is then locked.

The Adjust-Null-Adjust-Full Scale switch 368 is now set to the null position to connect the reference channels 210 and 340 into the circuit and the left phase control knob 382 is adjusted for the best null obtainable on the left null meter 356.

The rotor is now stopped and rotated by hand until the trial weight is at the top or bottom depending upon the position of the switch 214 and the securing screw 402 is loosened and the disc 404 rotated until its reference mark lines up with the reference mark on the phase control knob 382. The screw 402 is now tightened.

The trial weight is removed from the left side of the rotor and the rotor is again brought up to speed until the speed meter 322 is centered. The Adjust-Null-Adjust-Full Scale switch 368 is set to the Full Scale position and the right and left compensator multiplier knobs 176 and 488 are set to the Off position to switch these units out of the circuit. At this time all cross effect has been eliminated and the right and left channels have been calibrated both as to amplitude and phase. The right and left unbalance multiplier and digital knobs 196, 198, 348 and 364 are now adjusted until full scale readings are obtained respectively on the right and left null meters 272 and 356. At this time the multiplier and digital knobs accurately read the amount of unbalance in the respective planes.

The Adjust-Null-Adjust-Full Scale switch 368 is now set to the Null position to place the reference channels 210 and 340 in the circuit and the knobs 492 and 494 of these channels are adjusted for the best nulls obtainable on the respective meters 272 and 356.

The rotor 472 is stopped and rotated until the reference mark on the phase control knob 482 in the right unbalance channel and the reference marker on the disc 484 associated therewith are in alignment. At this time the heavy spot on the rotor in the right plane is either up or down depending upon the selected position of the switch 214 and appropriate correction can be made. The rotor is next rotated until the reference markers on the knob 382 and disc 404 in the left channel are in alignment and the heavy spot of the rotor in the left plane is either up or down in a similar manner.

None of the meters utilized in the equipment need be quantitatively calibrated nor is it necessary for the operator to record any amplitude or phase reading. At the termination of the balancing operation the rotor is automatically placeable in the correction position and the amount of correction is indicated by the unbalance scales associated with the particular plane involved. The possibility of operator error is thereby drastically reduced and the entire balancing procedure can be expressed as a series of manipulative steps which require no discretion on the part of the balance operator.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a two plane balancing machine including a pair of transducers, electronic means for plane separation, mixer means coupled to the output of each of said transducers, means for feeding signals from said transducers and said plane separation means to said mixer means, a pair of reference generators for determining the angular position of unbalance, each adapted to have its rotor mechanically driven in synchronism with the piece to be balanced, each generator having a movable stator, means for combining the output of each of said mixer means and its corresponding reference generator, and meter means for indicating the amplitude of signals from said combining means, the improvement comprising, first indicia means movable with each stator and having a reference mark thereon, second indicia means mounted adjacent said first indicia means and mechanically coupled to the generator rotors, said second indicia means having reference marks thereon which align with the reference marks on said first indicia means once for each revolution of said generators, said second indicia means being releasably coupled to said rotors whereby the reference marks thereon may be rotated relative to said rotors, and an amplitude adjusting network connected between each said mixer means and said meter means, each said network comprising an unbalance attenuator and a calibration attenuator wherein said unbalance attenuator is provided with indicia for indicating its setting.

2. In a two plane balancing machine including a pair of transducers, electronic means for plane separation, mixer means coupled to the output of each of said transducers, means for feeding signals from said transducers and said plane separation means to said mixer means, a pair of reference generators for determining the angular position of unbalance, each generator adapted to have its rotor mechanically driven in synchronism with the piece to be balanced, each generator having a movable stator, means for combining the output of each of said mixer means and its corresponding reference generator, and meter means for indicating the amplitude of signals from said combining means, the improvement comprising, first indicia means movable with each stator and having a reference mark thereon, second indicia means mounted adjacent said first indicia means and mechanically coupled to the generator rotors, said second indicia means having reference marks thereon which align with the reference marks on said first indicia means once for each revolution of said generators, said second indicia means being releasably coupled to said rotors whereby the reference marks thereon may be rotated relative to said rotors, an amplitude adjusting network connected between each said mixer means and said meter means, each said network comprising an unbalance attenuator and a calibration attenuator wherein said unbalance attenuator is provided with indicia for indicating its setting, a speed generator adapted to be driven by a piece under test, an indicating meter connected to the output of said speed generator, an adjustable source of voltage connected to said meter in opposition to said speed generator output and calibrated in terms of speed whereby said piece is rotating at the indicated speed when said meter indicates an equality of said voltage and said speed generator output, and tunable filter means connected between said transducers and said meter means, the tuning of said filter means being controlled with adjustment of said adjustable source of voltage.

3. A two plane balancing machine having input terminals for connection to transducers comprising, a pair of compensation generators adapted to be driven synchronously with the piece under test and each delivering an output of adjustable phase and amplitude mixable with the outputs of said transducers for simulating a balanced piece under test, electronic means for plane separation, mixer means coupled to receive an output from each of said transducer terminals, means for feeding signals from said transducer terminals, said compensation generators and said plane separation means to said mixer means, means for combining the output of each of said mixer means and a corresponding reference generator, a meter coupled to each said combining means for indicating its output, an amplitude adjusting network connected between each meter and its associated mixer means, each said network comprising an unbalance attenuator and a calibration attenuator wherein said unbalance attenuator is provided with indicia for indicating its setting, a pair of reference generators adapted to be driven synchronously with the piece under test and delivering an output to its associated combining means, each reference generator having a movable stator having first indicia means movable therewith and having a reference mark thereon, second indicia means mounted adjacent said first indicia means, said second indicia means having reference marks thereon which align with the reference marks on said first indicia means once for each revolution of said generators, said second indicia means being releasably coupled to said rotors whereby the reference marks thereon may be rotated relative to said rotors.

4. A balancing machine as set out in claim 7 wherein said first indicia means comprises an annular member mechanically connected to each said stator and said reference mark comprises a radial mark thereon, said second indicia means comprises a disc-like member mounted for rotation within said annular member and said reference mark comprises a radial mark thereon, and said disc-like member is attached to a shaft driven by each said rotor, said attachment being by means of a screw which permits release of said disc-like member for rotation relative to said rotor and annular member.

5. A two plane balancing machine having input terminals for connection to transducers comprising, a pair of compensation generators adapted to be driven synchronously with the piece under test and each delivering an output of adjustable phase and amplitude mixable with the outputs of said transducers for simulating a balanced piece under test, electronic means for plane separation, mixer means coupled to receive an output from each of said transducer terminals, means for feeding signals from said transducer terminals, said compensation generators, and said plane separation means to said mixer means, means for combining the output of each of said mixer means and a corresponding reference generator, a meter coupled to each said combining means for indicating its output, an amplitude adjusting network connected between each meter and its associated mixer means, each said network comprising an unbalance attenuator and a calibration attenuator wherein said unbalance attenuator is provided with indicia for indicating its setting, a pair of reference generators adapted to be driven synchronously with the piece under test and delivering an output to its associated combining means, each reference generator having a movable stator having first indicia means movable therewith and having a reference mark thereon, second indicia means mounted adjacent said first indicia means, said second indicia means having reference marks thereon which align with the reference marks on said first indicia means once for each revolution of said generators, said second indicia means being releasably coupled to said rotors whereby the reference marks thereon may be rotated relative to said rotors, and a speed generator adapted to be driven by a piece under test, an indicating meter connected to the output of said speed generator, an adjustable source of voltage connected to said meter in opposition to said speed generator output and calibrated in terms of speed whereby said piece is rotating at said speed when said meter indicates an equality of said voltage and said speed generator output, and tunable filter means connected between said transducers and said meters, the tuning of said filter means being controlled with adjustment of said adjustable source of voltage.

6. A balancing machine as set out in claim 4 including a front panel, said compensation generators and said reference generators being mounted on said panel, and belt means connecting the rotors of all said generators to a drive means adapted for connection to the piece under test, said annular members extending through said panel to the front thereof.

7. In a two plane balancing machine including a pair of transducers, electronic means for plane separation, mixer means coupled to the output of each of said transducers, means for feeding signals from said transducers and said plane separation means to said mixer means, means for combining the output of each of said mixer means and a corresponding reference generator, a pair of reference generators each having its output coupled to a different one of said combining means for determining the angular position of unbalance, each generator adapted to have its rotor mechanically driven in synchronism with the piece to be balanced, each generator having a movable stator, and meter means for indicating the amplitude of signals from said combining means, the improvement comprising an amplitude adjusting network connected between each mixer means and said meter means, each said network comprising an unbalance attenuator and a calibration attenuator wherein said unbalance attenuator is provided with indicia for indicating its setting, first indicia means movable with each stator and having a reference mark thereon, second indicia means mounted adjacent said first indicia means and mechanically coupled to the generator rotors, said second indicia means having reference marks thereon which align with the reference marks on said first indicia means once for each revolution of said generators, said second indicia means being releasably coupled to said rotors whereby the reference marks thereon may be rotated relative to said rotors.

References Cited by the Examiner

UNITED STATES PATENTS

| | | | |
|---|---|---|---|
| 2,228,011 | 1/41 | Lundgren | 73—464 |
| 2,828,911 | 4/58 | Lash | 73—464 |
| 2,980,331 | 4/61 | Gruber et al. | 73—462 X |
| 3,039,312 | 6/62 | Krobath | 73—465 |
| 3,077,781 | 2/63 | Silver | 73—465 |
| 3,098,391 | 7/63 | Maus | 73—462 |

FOREIGN PATENTS

| | | |
|---|---|---|
| 851,558 | 10/52 | Germany. |
| 729,901 | 5/55 | Great Britain. |

RICHARD C. QUEISSER, *Primary Examiner.*

ROBERT L. EVANS, *Examiners.*